(12) United States Patent
Nakano et al.

(10) Patent No.: US 9,966,813 B2
(45) Date of Patent: May 8, 2018

(54) ELECTRIC MOTOR AND ELECTRIC DEVICE EQUIPPED WITH SAME

(71) Applicant: Panasonic Intellectual Property Management Co., Ltd., Osaka (JP)

(72) Inventors: Keisaku Nakano, Osaka (JP); Yoshinori Isomura, Osaka (JP); Tomoko Yorino, Osaka (JP); Seiji Kurozumi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 215 days.

(21) Appl. No.: 15/027,689

(22) PCT Filed: Oct. 16, 2014

(86) PCT No.: PCT/JP2014/005249
§ 371 (c)(1),
(2) Date: Apr. 6, 2016

(87) PCT Pub. No.: WO2015/059905
PCT Pub. Date: Apr. 30, 2015

(65) Prior Publication Data
US 2016/0248296 A1    Aug. 25, 2016

(30) Foreign Application Priority Data
Oct. 21, 2013    (JP) ................... 2013-218079

(51) Int. Cl.
*H02K 11/00* (2016.01)
*H02K 5/173* (2006.01)
(Continued)

(52) U.S. Cl.
CPC ........... *H02K 5/1732* (2013.01); *H02K 11/33* (2016.01); *H02K 11/40* (2016.01)

(58) Field of Classification Search
CPC ....... H02K 5/1732; H02K 11/40; H02K 11/33
(Continued)

(56) References Cited

U.S. PATENT DOCUMENTS 3,831,160 A    8/1974    Cronin et al.
5,937,507 A    8/1999    Asakura et al.
(Continued)

FOREIGN PATENT DOCUMENTS

CN    102403840 A    4/2012
CN    202602468 U    12/2012
(Continued)

OTHER PUBLICATIONS

Y. Isomura et al. "Approaches to suppressing shaft voltage in non-insulated rotor brushless DC motor driven by PWM inverter" 2013 International Conference on Electrical Machines and Systems (ICEMS) 2013 pp. 1242-1247.*
(Continued)

*Primary Examiner* — Burton Mullins
(74) *Attorney, Agent, or Firm* — Hamre, Schumann, Mueller & Larson, P.C.

(57) ABSTRACT

Electric motor includes stator, rotor, a pair of bearings, outer-ring conducting part, and printed circuit board. Outer-ring conducting part electrically couples outer rings to each other that are included respectively in the pair of bearings. Printed circuit board includes drive circuit and an impedance element. Drive circuit includes ground line. Drive circuit controls an electric current that flows through stator winding. The impedance element is formed with at least not smaller than one pair of conductive patterns. One of the conductive patterns forming the impedance element is electrically coupled with outer-ring conducting part. The other
(Continued)

of the conductive patterns forming the impedance element is electrically coupled with ground line included in drive circuit.

9 Claims, 12 Drawing Sheets

(51) Int. Cl.
  *H02K 11/33* (2016.01)
  *H02K 11/40* (2016.01)
(58) Field of Classification Search
  USPC .......................................................... 310/90
  See application file for complete search history.

(56) References Cited

U.S. PATENT DOCUMENTS

| | | | | |
|---|---|---|---|---|
| 7,498,762 | B2* | 3/2009 | Takada | H02K 1/2786 |
| | | | | 310/43 |
| 8,502,427 | B2* | 8/2013 | Mizukami | H02K 11/40 |
| | | | | 310/72 |
| 8,525,374 | B2* | 9/2013 | Mizukami | H02K 5/08 |
| | | | | 310/43 |
| 8,552,601 | B2* | 10/2013 | Mizukami | H02K 1/30 |
| | | | | 310/216.124 |
| 8,587,167 | B2* | 11/2013 | Kado | H02K 5/08 |
| | | | | 310/68 R |
| 8,957,553 | B2* | 2/2015 | Hasegawa | H02K 5/08 |
| | | | | 310/43 |
| 8,975,796 | B2* | 3/2015 | Kado | H02K 5/08 |
| | | | | 310/43 |
| 2012/0038229 | A1 | 2/2012 | Watanabe et al. | |
| 2012/0133226 | A1 | 5/2012 | Hori et al. | |
| 2014/0270606 | A1 | 9/2014 | Hori et al. | |

FOREIGN PATENT DOCUMENTS

| | | |
|---|---|---|
| JP | 47-041121 B | 10/1972 |
| JP | 50-076547 | 6/1975 |
| JP | 57-016549 | 1/1982 |
| JP | 61-052618 B | 11/1986 |
| JP | 8-070553 | 3/1996 |
| JP | 8-214488 | 8/1996 |
| JP | 8-340637 | 12/1996 |
| JP | 10-032953 | 2/1998 |
| JP | 2004-229429 | 8/2004 |
| JP | 2007-159302 | 6/2007 |
| JP | 2010-158152 | 7/2010 |
| JP | 2010-166689 | 7/2010 |
| JP | 2011-047495 | 3/2011 |
| JP | 2012-060811 | 3/2012 |
| JP | 2013-038869 | 2/2013 |
| JP | 2013-087987 | 5/2013 |
| JP | 2013-150505 | 8/2013 |
| WO | 2010/098123 | 9/2010 |

OTHER PUBLICATIONS

International Search Report of PCT application No. PCT/JP2014/005249 dated Jan. 13, 2015.

Yoshihiko Okuyama et al, "Shaft Voltage for Inverter Drive Inducton Motor", Fuji Electric Journal vol. 72, No. 2, 1999.

The English Translation of Chinese Search Report dated Nov. 23, 2017 for the related Chinese Patent Application No. 201480057760.4, 2 pages.

* cited by examiner

ELECTRIC MOTOR AND ELECTRIC DEVICE EQUIPPED WITH SAME

This application is a U.S. national stage application of the PCT international application No. PCT/JP2014/005249 filed on Oct. 16, 2014, which claims the benefit of foreign priority of Japanese patent application No. 2013-218079 filed on Oct. 21, 2013, the contents all of which are incorporated herein by reference.

TECHNICAL FIELD

The present invention relates to electric motors and electric apparatuses equipped with the motors, and more particularly to reduction of occurrence of electrolytic corrosion of bearings installed in the motors.

BACKGROUND ART

Conventionally, in a circuit of sinusoidal-wave symmetrical three-phase alternating current (AC), the electric potential of the neutral point of a Y-connection is always constant when loop circuits for respective phases are equal to each other in terms of their configuration conditions. No electric potential difference occurs between the neutral point of a Y-connection disposed on the power supply side and the neutral point of a Y-connection disposed on the load side. In this case, the applied sinusoidal wave from a three-phase power supply is an undistorted sinusoidal wave without harmonic components.

Moreover, in the symmetrical three-phase AC circuit, imbalanced conditions for the configuration of each of the loop circuits have been known to exhibit the following properties. That is, the neutral point of the Y-connection disposed on the load side is not at zero potential, but at a certain potential. These properties described above are disclosed in Patent Literature 1, for example.

Note that observation of shaft voltages requires some ingenious techniques as follows, for example. That is, the observation of the shaft voltage is attained by measuring a voltage difference between pseudo-neutral points. As pseudo-neutral points, there are designated points which include: appropriate points in the symmetrical three-phase AC circuit, and the midpoint of a voltage divider circuit that is set for convenience of the measurement.

In a practical-use symmetrical three-phase AC circuit, its three-phase power supply is sometimes imbalanced due to various factors. Alternatively, in a symmetrical three-phase AC power supply, a sinusoidal wave supplied from the three-phase power supply sometimes contains some harmonic components. In addition, some electric potentials are observed at the neutral point of the Y-connection disposed on the power supply side and at the neutral point of the Y-connection disposed on the load side. Furthermore, resulting from a variation in potential of the neutral points, a voltage is induced at the rotary shaft installed in a generator or at the rotary shaft installed in a motor. The thus-induced voltage is observed as a so-called shaft voltage. Such a shaft voltage may sometimes be applied also to a bearing inner ring which rotatably supports the rotary shaft.

On the other hand, a bearing outer ring is electrically connected to the housing or grounding point of the generator or motor. Accordingly, the bearing outer ring is different in electric potential from the bearing inner ring. That is, a potential difference occurs between the bearing inner ring and the bearing outer ring. Consequently, electrical connection of the inner ring to the outer ring, via a rolling element of the bearing, results in discharges between the outer ring, the rolling element, and the inner ring. Such a discharge leaves a discharge mark at the place where the discharge occurred. The discharge mark is called electrolytic corrosion. The occurrence of the discharge mark, i.e. electrolytic corrosion, causes problems when the bearing rotates.

For example, as disclosed in Patent Literatures 2 to 4, the generator of a three-phase power supply sometimes has an imbalanced magnetic circuit that results from errors and misalignment caused when the generator has been assembled. Such an imbalance in the magnetic circuit hinders the configuration of the symmetrical three-phase AC circuit, resulting in imbalanced three phase AC. The imbalanced three phase AC, in turn, generates an electric potential at the neutral point, which results in a shaft voltage.

Moreover, an exciting winding of the generator is supplied with power from an exciting power supply. Such an exciting power supply may be an exciting arrangement that uses a thyristor and the like. In this case, the exciting winding is applied with a voltage of a non-sinusoidal wave which contains a large amount of harmonics. The generator has an equivalent impedance component which is resulted from generator's configuration members including the exciting winding. Via such an equivalent impedance component, the applied voltage of the non-sinusoidal wave generates a shaft voltage which is attributed to the exciting power supplied from the exciting arrangement.

Moreover, as disclosed in the Patent Literatures described above, an electric generator shows the following typical phenomenon. That is, water vapors collide with the blades of a steam turbine of the generator. Upon collision, some of the water vapors are ionized and charged. The electric charge generated by the ionized vapors is conveyed to the rotary shaft via the equivalent impedance component. The thus-conveyed charge causes a shaft voltage of the generator. Such a shaft voltage of the generator has been known to cause electrolytic corrosion of the bearings.

On the other hand, Patent Literature 5 discloses the followings. That is, the motor disposed on the load side in a symmetrical three-phase AC circuit shows a shaft voltage that is caused by imbalance in a three-phase AC. The thus-caused shaft voltage, in turn, causes electrolytic corrosion of the bearings of the motor disposed on the load side. Moreover, Patent Literature 5 discloses the case in which a motor is driven through use of an inverter device. That is, in such a motor, a momentary imbalance in voltage is caused every time the power switches. In other words, the motor is such that the voltage of the neutral point varies at a very high frequency. The frequency sometimes reaches a few MHz. Thus, such variations in the voltage of the neutral point cause a shaft voltage, resulting in flowing of a shaft current. As a result, the bearings of the motor suffer from electrolytic corrosion.

In the area of electric motors, remarkable proliferation of drive technologies using inverter devices has recently been achieved. Such drive technologies using inverter devices are essentially different from the drive technologies using power supplies that can generate power of undistorted sinusoidal waves. That is, each of the drive technologies using inverter devices configures a rectangular-wave voltage source to perform a pseudo-three phase drive. Patent Literature 5 discloses the followings. That is, with the drive technology using an inverter device, a shaft voltage is generated due to variations in the electric potential at its neutral point. The generation of the shaft voltage results in flowing of a shaft current in the motor. Consequently, the bearings of the motor are prone to suffer the electrolytic corrosion.

As is commonly known, the drive technology using an inverter device is not the technology of driving on the basis of symmetrical three-phase AC supplied from a power supply of an undistorted sinusoidal wave. Thus, this drive technology cannot offer any phenomenon in which the voltages of phases cancel each other to be zero all the time That is, at the neutral point of a Y-connection of the motor, a voltage of a certain value is generated.

For example, Non-Patent Literature 1 to be described later discloses the followings. That is, the motor driven by an inverter device has a neutral point of a Y-connection. At the neutral point of the Y-connection, there occurs a periodic variation in voltage with large amplitudes associated with convex waves and square waves. The maximum voltages of such convex waves and square waves may rise to reach the power supply voltage of the inverter device.

Non-Patent Literature 1 is the article that appeared in Fuji Electric Journal Vol. 72, No. 2, p. 144-149, February 1999, entitled "Shaft Voltage of PWM Inverter-Driven Induction Motors."

As described in Non-Patent Literature 1, the variation in voltage at the neutral point is observed as the shaft voltage of the rotary shaft.

As disclosed in such as Non-Patent Literature 1, the drive voltage of each phase supplied from the inverter device is transmitted, as an electric energy, to the outside of a stator via the following path. That is, the drive voltage of each phase is transmitted from a stator winding of the stator of the motor, through impedance components of members that configure the stator, to the outside of the stator.

The electric energy is transmitted to a rotor of the motor via distributed capacitance between the stator and rotor of the motor. Moreover, the electric energy arrives at the rotary shaft via impedance components of members that configure the rotor. The rotary shaft is positioned at the neutral point of the Y-connection which is equivalent to the symmetrical three-phase AC circuit that includes an equivalent circuit of the motor. Therefore, at the rotary shaft of the motor, some variation in electric potential is observed. This electric potential is called the shaft voltage as described above.

In the symmetrical three-phase AC circuit, there exists a third-order harmonic component for each phase. Such third-order harmonic components do not cancel each other. The third-order harmonic components are known to be observed at the neutral point of the Y-connection. In addition, an imbalanced component as well for each phase is known to be observed at the neutral point of the Y-connection.

By the way, the drive method of the motor commonly adopts inverter driving by a Pulse Width Modulation method (referred as "PWM method," hereinafter). In cases of the inverter driving by the PWM method, the electric potential of the neutral point of the winding is not equal to zero. The neutral point of the winding shows some potential as described above.

The occurrence of variations in electric potential at the neutral point of the winding described above is analyzed from the following point of view. That is, the motor includes constituent elements that configure it. An equivalent circuit is derived from the constituent elements configuring the motor. The equivalent circuit is derived on the basis of equivalent electrical impedance components which the constituent elements have. The thus-derived equivalent circuit is treated as a symmetrical three-phase AC circuit.

In the equivalent circuit, the rotary shaft of the motor can be considered as the neutral point of the Y-connection. Therefore, it is clear that some variations in electric potential can occur at the rotary shaft of the motor.

For example, the electrically equivalent impedance components are extracted from the constituent elements that configure the motor, with each of the elements having the corresponding component. On the basis of the thus-extracted equivalent impedance components, the equivalent circuit of the motor is derived, with the circuit including the constituent elements that configure the motor. Using the thus-derived equivalent circuit of the motor, it has been attempted to calculate the shaft voltage.

Patent Literature 5, Non-Patent Literature 1, and the like disclose the followings. That is, from each of constituent elements that configure a motor, an equivalent electrical impedance component of the element is extracted. An equivalent circuit of the motor is derived by using the thus-extracted equivalent impedance components. By using the thus-derived equivalent circuit, the process by which a shaft voltage is generated is analyzed. On the basis of the result of the analysis, the occurrence of electrolytic corrosion is reduced.

The equivalent circuit of the motor can be analyzed by any of various methods that include: an analysis based on a concept of a distributed constant circuit; an analysis based on a modeled lumped-constant circuit that is derived by modeling the distributed constant circuit, with each of principal circuit elements of the distributed constant circuit being translated into a lumped constant element; and analyses by other various techniques.

Note that the motor's equivalent circuit, which includes the constituent elements that configure the motor, is different depending on the type and structure of the motor. Specifically, the equivalent circuit of a motor in which the stator winding and stator iron core are covered with an insulating resin is clearly different from that of a motor in which the stator winding and stator iron core are covered with a metal case.

Moreover, the motor's equivalent circuit is different also depending on elements that configure the rotor of the motor. For example, the equivalent circuit is different depending on whether or not the rotor includes a rotor iron core that configures a backyoke of the rotor. Alternatively, the equivalent circuit differs depending on whether the resistance of magnets is high or low, with the magnets forming magnetic poles of the rotor. In addition, it is clear that the equivalent circuit of the motor differs depending also on combinations of these factors.

As described above, the motors' equivalent circuits which include constituent elements that configure the motors are different in different types and configurations of the motors. Consequently, technologies which are considered to be optimum for reducing the electrolytic corrosion are different in different types and configurations of the motors. In other words, it is very difficult to present such technologies for reducing the electrolytic corrosion which would be commonly applicable to all types of the motors.

Thus, in general, the technology for reducing electrolytic corrosion has to be examined for each type and configuration of the motors, on a one-for-each basis. To date, a wide range of the technologies for reducing electrolytic corrosion have been proposed.

The inverter driving causes the shaft voltage, which in turn produces an electric potential difference between the bearing outer ring and the bearing inner ring. The shaft voltage contains harmonic components attributed to inverter switching. In the inside of the bearing, an oil film is disposed. If the potential difference rises equal to the voltage at which an electrical breakdown of the oil film can occur, a high-frequency electric current flows through the inside of the bearing. The flowing of the high-frequency electric current causes electrolytic corrosion of the inside of the bearing. Development of the electrolytic corrosion causes an undulately-wearing phenomenon in the inside of either the inner ring of the bearing or the outer ring of the bearing, which can cause unusual noise. With the motors, such electrolytic corrosion is a typical and problematic phenomenon to be solved.

As described above, the electrolytic corrosion is the phenomenon in which members configuring the bearing are subjected to damage caused by arc discharges. The shaft voltage causes an electric potential difference between the bearing inner ring and the bearing outer ring. The discharge current caused by the shaft voltage is such that the shaft current flows through the path, i.e. from the bearing inner ring through balls serving as rolling elements to the bearing outer ring. Thus, the following countermeasures have been proposed to reduce the occurrence of the electrolytic corrosion.

(1) Producing a conducting state between the bearing inner ring and the bearing outer ring.

(2) Producing an insulating state between the bearing inner ring and the bearing outer ring.

(3) Reducing the shaft voltage.

A specific way of implementing countermeasure (1) described above may include substitution of electric-conductive lubricant oil for the lubricant used in the bearing. However, the substitution has a problem in which the conductive lubricant oil will decrease, with time, in the electric conductivity and/or in the reliability of sliding movement, for example.

Another specific way of implementing countermeasure (1) described above may also be considered in which a brush is set to make the rotary shaft conductive. However, the brush has a problem in which wear particles come from the brush and the brush requires an additional space for the setting thereof, for example.

Yet another specific way of implementing countermeasure (1) described above may also be considered in which a slide bearing is used for the bearing. In this method, the slide bearing may be an oil-retaining bearing which is fabricated by sintering a metal and impregnating it with oil. The use of the oil-retaining bearing for the slide bearing allows the bearing to be in a conductive state.

In recent years, for motors controlled by inverter driving by the PWM method, a configuration has been in a mainstream, in which ball bearings are used at both sides of their rotor. Prior to these motors, however, a common configuration of motors had been such that slide bearings were used at both sides of their rotor.

For example, Patent Literatures 6 and 7 disclose the followings. That is, there is no occurrence of discharge in the bearings because they are conductive, resulting in no electrolytic corrosion.

Unfortunately, the use of the slide bearings is less in rotary accuracy of the rotating shaft than the use of the ball bearings. Moreover, the use of the slide bearings exhibits a large loss attributed to the bearings. Therefore, the motor using the slide bearings has reduced efficiency compared with the motor using the ball bearings.

A specific way of implementing countermeasure (2) described above may include changing of the material of the rolling elements located at the inside of the bearing, from the conductive metal such as iron to an electric insulator such as a ceramic material. This way can feature a very high effect of reducing the occurrence of electrolytic corrosion. Unfortunately, the way faces an economic problem of requiring higher costs.

Another specific way of implementing countermeasure (2) described above may also be considered to include use of insulating slide bearings for the bearings. For example, Patent Literature 8 discloses the followings. That is, the bearings employ slide bearings which are formed of a resin and have insulation properties. With this configuration, the bearing units can be made in an insulating state, resulting in no occurrence of electrolytic corrosion of the bearing units that have insulation properties.

Unfortunately, in the same manner as that described above, the rotational accuracy of the rotating shaft is lower with the slide bearings than with the ball bearings. Moreover, the sliding bearing formed of resin shows a large loss in the bearing. Accordingly, the motor using the sliding bearings formed of resin shows a lower efficiency than the motor using the ball bearings.

As a specific way of implementing countermeasure (3) described above, the method as described in Patent Literature 9 has been known. That is, a dielectric layer is disposed in the rotor to reduce the shaft voltage, thereby reducing the occurrence of electrolytic corrosion.

As another specific way of implementing countermeasure (3) described above, the method as described in Patent Literature 10 has been known. That is, a stator iron core and a conductive metal bracket are electrically short-circuited. Such a short-circuit changes electrostatic capacity between the stator iron core and the bracket, thereby reducing the shaft voltage.

Moreover, as yet another specific way of implementing countermeasure (3) described above, the method as described in Patent Literature 11 has been known. That is, the stator iron core and the like of a motor are electrically connected to a ground, i.e. the earth.

CITATION LIST

Patent Literatures

PTL 1: Japanese Patent Unexamined Publication No. H08-340637

PTL 2: Japanese Patent Examined Publication No. S47-41121

PTL 3: Japanese Patent Unexamined Publication No. S50-76547

PTL 4: Japanese Patent Unexamined Publication No. S57-16549

PTL 5: Japanese Patent Unexamined Publication No. H10-32953

PTL 6: Japanese Patent Examined Publication No. S61-52618

PTL 7: Japanese Patent Unexamined Publication No. H08-214488

PTL 8: Japanese Patent Unexamined Publication No. 2011-47495

PTL 9: Japanese Patent Unexamined Publication No. 2010-166689

PTL 10: Japanese Patent Unexamined Publication No. 2007-159302

PTL 11: Japanese Patent Unexamined Publication No. 2004-229429

Non-Patent Literature

NPTL 1: Fuji Electric Journal Vol. 72, No. 2, p. 144-149, February 1999, entitled "Shaft Voltage of PWM Inverter-Driven Induction Motors"

SUMMARY OF THE INVENTION

An electric motor, a subject of the present invention, includes a stator, a rotor, a pair of bearings, an outer-ring conducting part, and a printed circuit board.

The stator includes a stator iron core and a winding which is wound on the stator iron core.

The rotor includes a rotating body and a shaft. The rotating body includes permanent magnets, an outer iron core, an inner iron core, and a dielectric layer. The permanent magnets face the stator, and are located in the circumference direction. The outer iron core is formed by stacking steel sheets, and is located on the outer peripheral side. The inner iron core is formed by stacking steel sheets, and is located on the inner peripheral side. The dielectric layer is located between the outer iron core and the inner iron core. The shaft passes through the shaft center of the rotating body, and is attached to the rotating body. The shaft is such that, in the direction of the shaft center, one side of the shaft is the output shaft side while the other side is the non-output shaft side.

Each of the pair of the bearings includes an inner ring and an outer ring. The pair of the bearings interposes the rotating body between them in the direction of the shaft center. Moreover, the pair of the bearings rotatably supports the shaft.

The outer-ring conducting part electrically couples the outer rings to each other that are included respectively in the pair of the bearings.

The printed circuit board includes a drive circuit and an impedance element. The drive circuit includes a ground line. The drive circuit controls an electric current that flows through the winding. The impedance element is configured with at least not smaller than one pair of conductive patterns.

In particular, one of the conductive patterns which form the impedance element is electrically coupled with the outer-ring conducting part. Moreover, the other of the conductive patterns which form the impedance element is electrically coupled with the ground line that is included in the drive circuit.

DESCRIPTION OF EMBODIMENTS

Figure 1:
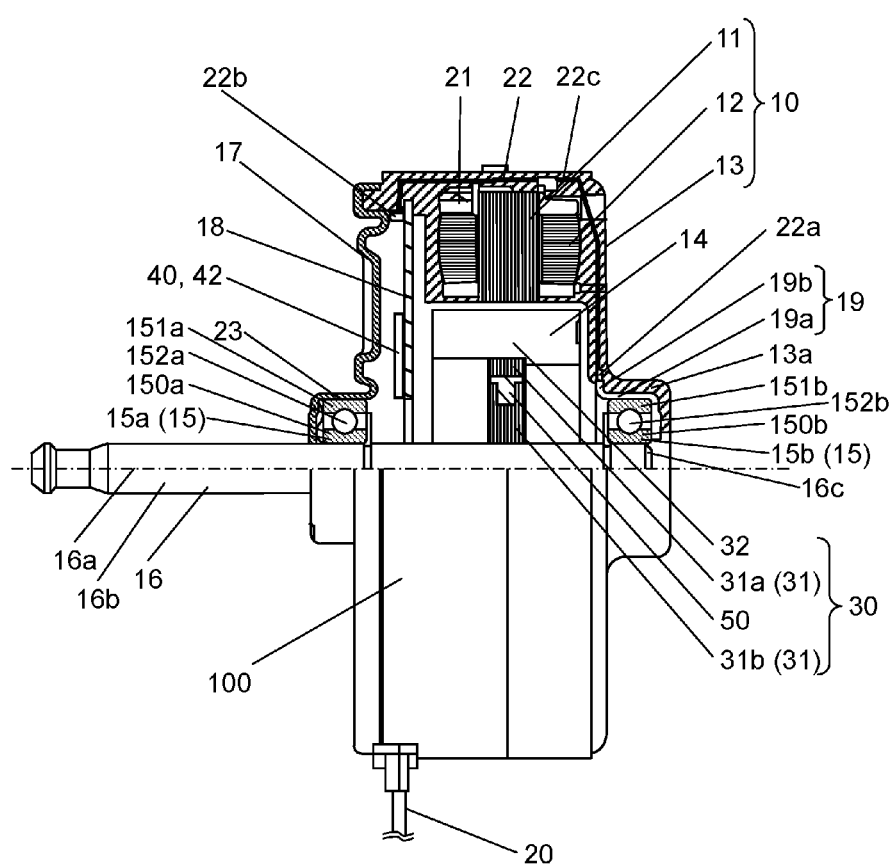
FIG. 1 is a cross-sectional view of a principal part of an electric motor according to a first embodiment of the present invention.

Electric motors according to embodiments of the present invention are capable of reducing occurrence of electrolytic corrosion of their bearings, by adopting configurations to be described later. Moreover, electric apparatuses according to the embodiments of the invention each can be equipped with the motor capable of reducing the occurrence of the electrolytic corrosion of its bearings, by adopting configurations to be described later.

Incidentally, conventional electric motors have posed the following problems to be improved.

Any of the conventional technologies described earlier can be adopted to improve motors to some extent; however, motors today still require further technical improvement.

Some electric motors are so-called resin molded motors, and some are so-called steel-sheet motors. The resin molded motor is one in which its stator and the like are integrally molded with a resin. The steel-sheet motor is one in which armor of its stator and the like is accommodated in a metal case.

The technology disclosed in Patent Literature 9 is sometimes adopted in resin molded motors or steel-sheet motors. For a conventional motor, this technology utilizes a capacitive component provided by its dielectric layer, which allows a reduction in high-frequency induced voltage at its bearing inner ring.

Unfortunately, even using the technology disclosed in Patent Literature 9, there has been a limit beyond which the technology cannot reduce the shaft voltage of the conventional motor to an appropriate level.

Note that, for such a conventional motor, the following methods are known which include changing the capacitive component provided by the dielectric layer.

The conventional motor includes a rotor which has a rotating body and a shaft. The rotating body used in the conventional motor has an outer iron core, an inner iron core, and the dielectric layer located between the outer iron core and the inner iron core. The dielectric layer is formed of an insulating resin.

One method is to change a dielectric constant of the insulating resin that forms the dielectric layer. The change of the dielectric constant of the insulating resin results in a change in the electrostatic capacity.

Another method is to change a distance between the outer iron core and inner iron core of the rotating body. The change in the distance between the outer iron core and inner iron core results in a change in thickness of the insulating resin. The change in thickness of the insulating resin results in a change in the electrostatic capacity.

Yet another method is to change both a length of the outer iron core along the direction of the shaft center and a length of the inner iron core along the direction of the shaft center. The change in the lengths of the outer and inner iron cores along the direction of the shaft center, results in a change in an area in which both the iron cores face each other. The change in the facing area of both iron cores results in a change in the electrostatic capacity.

By the way, for electric motors used in different electric apparatuses, substantially different specifications of the motors are set, regarding their rated values, shapes, etc. Accordingly, the stators have to be subjected to tolerances, regarding their shape and dimension, within which the stators are allowed to be used in the motors. Commonly, the shapes and dimensions of the stators are standardized. This means that the dimensions and the like of the stators are difficult to greatly modify. Therefore, the shapes and dimensions of the dielectric layers included in the stators are also not easily modified.

Moreover, in cases where the dielectric constant of the insulating resin that forms the dielectric layer is modified, the resin material is sometimes changed. However, before the resin material is changed, a candidate material has to be evaluated for various items including strength, besides its dielectric constant. The number of the items to be checked in the evaluation is so large that the changing of the resin material is not easily made.

Alternatively, another method is also possible by which a capacitor is inserted between a bracket located on the output shaft side and the ground of a printed circuit board. Unfortunately, such an insertion of the additional capacitor results in a larger thickness of the whole of the printed circuit board.

The present invention is aimed at solving these problems described above that have hindered introduction of the dielectric layers into the rotors.

Hereinafter, the embodiments of the present invention will be described with reference to the accompanying drawings. It is noted, however, that all the embodiments described below are nothing more than examples of implementation of the present invention, and are not intended to impose any limitation on the technical scope of the present invention.

First Exemplary Embodiment

In a first embodiment, an electric apparatus according to the embodiment will be exemplified by, in particular, an air conditioner which can offer outstanding functional effects of the embodiment. A motor to be described later is installed in an indoor unit of the air conditioner. The motor is a brushless motor which drives a blower fan. Hereinafter, the motor will be described by using an example of an inner-rotor type motor in which its rotor is rotatably disposed on the inner peripheral side of its stator.

FIG. 1 is a cross-sectional view of a principal part of the electric motor according to the first embodiment of the present invention.

As shown in FIG. 1, electric motor 100 includes stator 10, rotor 14, a pair of bearings 15a and 15b, outer-ring conducting part 22, and printed circuit board 18.

Stator 10 includes stator iron core 11 and stator winding 12 that is a winding wound on stator iron core 11.

Rotor 14 includes rotating body 30 and shaft 16. Rotating body 30 includes magnets 32 which are permanent magnets, outer iron core 31a, inner iron core 31b, and dielectric layer 50. Magnets 32, which are the permanent magnets, are located to face stator 10, in the circumference direction. Outer iron core 31a is formed by stacking steel sheets and located on the outer peripheral side. Inner iron core 31b is formed by stacking steel sheets and located on the inner peripheral side. Dielectric layer 50 is located between outer iron core 31a and inner iron core 31b. Shaft 16 is attached to rotating body 30, passing through shaft center 16a of rotating body 30. Shaft 16 is arranged such that, in the direction of shaft center 16a, one side of the shaft is the output shaft 16b side, and the other side is the non-output shaft 16c side.

Each of the pair of bearings 15a and 15b includes inner rings 150a and 150b and outer rings 151a and 151b, respectively. The pair of bearings 15a and 15b is located with rotating body 30 being interposed between them in the direction of shaft center 16a. Moreover, the pair of bearings 15a and 15b rotatably supports shaft 16. Note that the pair of bearings 15a and 15b may also be collectively called "bearings 15."

Outer-ring conducting part 22 electrically couples outer rings 151a and 151b to each other which are included in the pair of bearings 15a and 15b, respectively.

Figure 4:
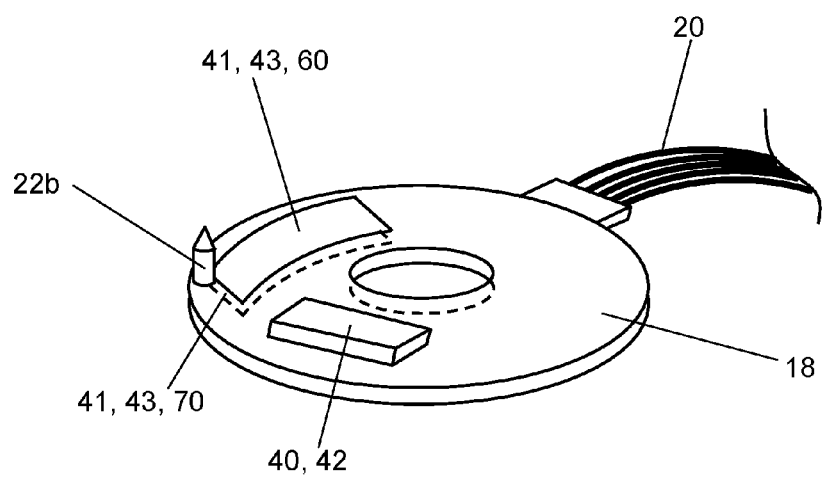
FIG. 4 is a perspective view of yet another Specific Example 1 of the printed circuit board that is used in the motor according to the first embodiment of the invention.

As shown in FIG. 4, printed circuit board 18 includes drive circuit 40 and impedance element 41. Drive circuit 40 includes ground line 42. Drive circuit 40 controls an electric current which flows through a winding, i.e. stator winding 12. Impedance element 41 is configured with at least not smaller than one pair of conductive patterns 60 and 70. Detail descriptions of FIG. 4 will be made later.

In particular, conductive pattern 60 on the one side, which configures impedance element 41, is electrically coupled with outer-ring conducting part 22. Conductive pattern 70 on the other side, which configures impedance element 41, is electrically coupled with ground line 42 of drive circuit 40.

A mode which can offer particularly outstanding functional effects is as follows.

That is, as shown in FIG. 1, electric motor 100 includes a pair of brackets 17 and 19 that holds the pair of bearings 15a and 15b, respectively. The pair of brackets 17 and 19 is formed of metal, and is electrically conductive.

In electric motor 100, conductive pattern 60 on the one side, which configures impedance element 41, is electrically coupled with outer-ring conducting part 22 and at least one of the pair of brackets 17 and 19.

Moreover, electric motor 100 includes resin armor part 13 that is a resin part with which stator 10 and bracket 19 located on the non-output shaft 16c side are integrally molded. Of the pair of brackets 17 and 19, bracket 19 holds bearing 15b which is located on the non-output shaft 16c side of shaft 16.

Moreover, in electric motor 100, resin armor part 13 serving as the resin part buries at least a part of outer-ring conducting part 22.

More detailed descriptions are made with reference to the drawings.

As shown in FIG. 1, stator winding 12 serving as a winding is wound on stator iron core 11. Between stator iron core 11 and stator winding 12, insulator 21 formed of an insulating resin is interposed.

Stator iron core 11 is molded with a mold material, i.e. resin armor part 13, together with other fixing members. Resin armor part 13 serving as the resin part is formed of an insulating resin. In the first embodiment, electric motor 100 is integrally molded with resin armor part 13. Thus, electric motor 100 is configured including stator 10 which has the outside shape being substantially cylindrical.

In the inside of stator 10, rotor 14 is inserted via an air gap. Rotor 14 includes: rotating body 30 having a disk-like shape which includes rotor iron core 31, and shaft 16 which passes through shaft center 16a of rotating body 30.

Rotating body 30 faces the inner peripheral side of stator 10, and holds magnets 32 in the circumference direction, with the magnets being permanent magnets made of a ferrite resin.

As shown in FIG. 1, rotating body 30 is configured by arranging outer iron core 31a, dielectric layer 50, and inner iron core 31b, in this order from magnets 32 at the outermost periphery toward shaft 16 on the inner peripheral side. Outer iron core 31a is located on the outer peripheral side of rotating body 30. Inner iron core 31b is located on the inner peripheral side of rotating body 30.

That is, rotating body 30 according to the first embodiment is integrally formed including: rotor iron core 31 configured with outer iron core 31a and inner iron core 31b, dielectric layer 50, and magnets 32. In this way, the inner peripheral side of stator 10 and the outer peripheral side of rotating body 30 are arranged to face each other.

The pair of bearings 15a and 15b is attached to shaft 16 so as to support the shaft, with shaft 16 being fastened to rotating body 30. The pair of bearings 15a and 15b is each a ball bearing. The pair of bearings 15a and 15b is each a cylindrical bearing which includes a plurality of iron balls serving as rolling elements 152a and 152b. Bearings 15a and 15b are such that inner rings 150a and 150b of respective bearings 15a and 15b are fixed to shaft 16.

As shown in FIG. 1, shaft 16 includes output shaft 16b that is a shaft's portion which protrudes from the body of electric motor 100. In the embodiment, bearing 15a supports shaft 16, with the bearing being located on the output shaft 16b side. Bearing 15b supports shaft 16, with the bearing being located on the non-output shaft 16c side which is opposite to the output shaft side.

Bearings 15a and 15b are fixed to brackets 17 and 19, respectively, in such a manner that outer rings 151a and 151b of bearings 15a and 15b are fixed to the corresponding brackets, respectively. Brackets 17 and 19 are formed of an electrically-conductive metal. As shown in FIG. 1, bearing 15a is fixed to bracket 17 located on the output shaft 16b side. Bearing 15b is fixed to bracket 19 located on the non-output shaft 16c side. With the configuration described above, shaft 16 is supported by two bearings 15a and 15b, thereby making rotor 14 rotatable.

Moreover, as shown in FIG. 1, electric motor 100, which is the brushless motor according to the first embodiment, accommodates printed circuit board 18 on which drive circuit 40 including a control circuit is mounted. Electric motor 100 is assembled in such a manner that, after printed circuit board 18 has been accommodated, bracket 17 located on the output shaft 16b side is press-fitted onto stator 10. In this way, the brushless motor is completed.

A number of interconnection lines 20 are coupled with printed circuit board 18. Via interconnection lines 20, printed circuit board 18 is supplied with power supply voltage Vdc applied to stator winding 12, power supply voltage Vcc applied to the control circuit, and control voltage Vsp for controlling the rotation number. In addition, ground line 42 and the like are also coupled with printed circuit board 18.

By the way, a zero-potential point on printed circuit board 18 on which drive circuit 40 is mounted is insulated from both the ground and a primary-side power supply circuit. That is, the zero-potential point is in the state where its potential is floating relative to the earth and the primary-side power supply circuit.

Here, the zero-potential point as referred herein is the point of a potential of 0 (zero) volt that serves as a reference potential in printed circuit board 18. Such a zero-potential point is commonly a ground interconnection, i.e. so-called the ground. The ground line included in interconnection lines 20 is coupled with the zero-potential point, i.e. the ground interconnection.

With printed circuit board 18 on which drive circuit 40 is mounted, a power supply circuit is coupled so as to supply the power supply voltage to stator winding 12. This power supply circuit is electrically insulated from both the primary-side power supply circuit and the ground with which the primary-side power supply circuit is coupled.

With the control circuit, a power supply circuit is coupled so as to supply the power supply voltage. This power supply circuit is electrically insulated from both the primary-side power supply circuit and the ground with which the primary-side power supply circuit is coupled.

Moreover, the control power supply is coupled with lead lines. Besides this, the control circuit is coupled with the ground line. These lead lines and ground line are electrically insulated from the ground that is earthed independently.

That is, drive circuit 40 mounted on printed circuit board 18 is in an electrically isolated state from the potential of the primary-side power supply circuit and the ground potential. In other words, drive circuit 40 mounted on printed circuit board 18 is in the state where its potential is floating relative to the potential of the primary-side power supply circuit and the ground potential. This state is also referred to as a potential-floated state.

Accordingly, the following power supply circuit is also called the floating power supply. That is, the power supply circuit concerned includes one which supplies the power supply voltage to stator winding 12 that is coupled with printed circuit board 18. Alternatively, the power supply circuit includes another one which supplies the power supply voltage to the control circuit.

To the thus-configured brushless motor according to the first embodiment, the power supply voltages and the control signals are supplied via interconnection lines 20. Upon supplied with the power supply voltages and control signals, drive circuit 40 mounted on printed circuit board 18 energizes stator winding 12 that is wound on stator 10. Upon energization of stator winding 12 wound on stator 10, drive current flows through stator winding 12. The magnetic field generated by stator winding 12 becomes a concentrated magnetic field via stator iron core 11.

Between the magnetic field via stator iron core 11 and the magnetic field generated by ferrite resin magnets 32, attractive and repulsive forces occur in accordance with the polarities of these magnetic fields. These attractive and repulsive forces are responsible for the rotation of rotor 14 about shaft 16, i.e. the center.

Next, a more detailed configuration will be described regarding the brushless motor according to the first embodiment.

As described above, in electric motor 100 which is the brushless motor, shaft 16 is supported by the pair of bearings 15. Moreover, bearings 15a and 15b are fixed by brackets 17 and 19, respectively. Brackets 17 and 19 are formed of an electrically conductive metal.

Specifically, the configuration is formed in the following manner. First, bracket 19 is attached to bearing 15b located on the non-output shaft 16c side.

The diameter of the outer periphery of bracket 19 is approximately equal to the diameter of the outer periphery of outer ring 151b of bearing 15b. Bearing 15b is press-fitted into bracket 19 located on the non-output shaft 16c side, thereby being secured there. Then, bracket 19 into which bearing 15b has been press-fitted is integrally molded together with resin armor part 13.

That is, as shown in FIG. 1, resin armor part 13 on the non-output shaft 16c side includes protrusion part 13a that protrudes from a central portion of the body of electric motor 100, in the direction toward non-output shaft 16c. In the inside of protrusion part 13a, bracket 19 located on the non-output shaft 16c side is disposed as an inner bracket. Bracket 19 is integrally molded together with resin armor part 13.

Moreover, in electric motor 100 according to the first embodiment, outer-ring conducting part 22, which is a conductor, provides electrical continuity between bracket 17 located on the output shaft 16b side and bracket 19 located on the non-output shaft 16c side. A portion of outer-ring conducting part 22, i.e. a conductor, is buried in a resin that forms resin armor part 13.

Specifically, with bracket 19 located on the non-output shaft 16c side, non-output-shaft side current-carrying pin 22a is electrically coupled in advance. As shown in FIG. 1, bracket 19 is such that one end of non-output-shaft side current-carrying pin 22a is coupled with collar part 19b of the bracket. Non-output-shaft side current-carrying pin 22a is disposed in the inside of resin armor part 13. In the same manner as for bracket 19, non-output-shaft side current-carrying pin 22a is integrally molded with the resin that forms resin armor part 13.

Non-output-shaft side current-carrying pin 22a is disposed in the inside of resin armor part 13, being as a component located inside electric motor 100. This configuration prevents non-output-shaft side current-carrying pin 22a from being subjected to troubles including rusting, external forces, and so on. Therefore, this allows a highly reliable electrical connection which is durable against the environment in which electric motor 100 is operated, external stresses applied on electric motor 100, and the like.

Non-output-shaft side current-carrying pin 22a is coupled with lead wire 22c. Lead wire 22c is extended from collar part 19b toward the direction of the outer periphery of electric motor 100, i.e. the brushless motor, in the inside of resin armor part 13. Moreover, lead wire 22c is further extended, in parallel with the direction in which shaft 16 is extended, from the neighborhood of the outer periphery of electric motor 100 toward the output shaft 16b side. Lead wire 22c is exposed from the end surface on the output shaft 16b side of resin armor part 13.

Lead wire 22c exposed from resin armor part 13 is electrically coupled with output-shaft side current-carrying pin 22b that is attached on printed circuit board 18. In addition, lead wire 22c is electrically coupled with bracket 17 as well, via output-shaft side current-carrying pin 22b that is in contact with bracket 17 located on the output shaft 16b side.

With the configuration described above, the pair of brackets 17 and 19 is electrically coupled with each other via outer-ring conducting part 22. In the first embodiment, outer-ring conducting part 22 is formed including non-output-shaft side current-carrying pin 22a, lead wire 22c, and output-shaft side current-carrying pin 22b.

Moreover, outer-ring conducting part 22 electrically couples bracket 17 located on the output shaft 16b side to bracket 19 located on the non-output shaft 16c side, with both bracket 17 and bracket 19 being insulated from stator iron core 11 by resin armor part 13.

Bracket 19 located on the non-output shaft 16c side includes cylindrical part 19a having a hollow-cylindrical cap shape. Cylindrical part 19a has an opening on one side thereof. Bracket 19 includes ring-shaped collar part 19b which expands in the direction toward the outer periphery, with cylindrical part 19a being a center. Collar part 19b expands toward the outer periphery from the portion where cylindrical part 19a opens. The diameter of the inner periphery of cylindrical part 19a is approximately equal to the diameter of the outer periphery of bearing 15b. Bearing 15b is press-fitted into cylindrical part 19a, thereby being fixed to bracket 19. In addition, bearing 15b is fixed to resin armor part 13 as well, via bracket 19.

With this configuration, outer ring 151b of bearing 15b located on the non-output shaft 16c side is press-fitted into metal bracket 19, thereby being fixed there. Consequently, electric motor 100 according to the first embodiment can also reduce the occurrence of faults due to creeping.

Moreover, the diameter of the outer periphery of collar part 19b of bracket 19 located on the non-output shaft 16c side is larger than the diameter of the outer periphery of bearing 15b. Furthermore, the diameter of the outer periphery of collar part 19b of bracket 19 is smaller than at least the diameter of the outer periphery of rotating body 30.

Such a configuration of bracket 19 allows a reduced amount of metal materials to be used. Specifically, in the case of the configuration where collar part 19b is made larger than the diameter of the outer periphery of rotating body 30 to be large enough to cover stator 10, a larger amount of the metal materials is needed. Therefore, the aforementioned configuration of bracket 19 allows both a reduced amount of use of the metal materials, resulting in a reduced increment of costs of the bracket.

Moreover, as described above, the configuration is such that bracket 19 made of a metal material is reduced in its surface area, and that the contour of bracket 19 is integrally covered and molded with resin armor part 13. Therefore, this reduces noise generated at bearing 15b.

Next, bearing 15a located on the output shaft 16b side is fixed by bracket 17, the outer periphery of which is approximately equal in diameter to the outer periphery of stator 10. Bracket 17 attached on the output shaft 16b side has a substantially disk-like shape. Bracket 17 located on the output shaft 16b side includes protrusion part 23 formed in the central portion of the bracket, with the protrusion part having the inner periphery which is approximately equal in diameter to the outer periphery of bearing 15a. The inside of protrusion part 23 is hollow.

Printed circuit board 18 is attached to stator 10. Bearing 15a is press-fitted into the inside of protrusion part 23 which is formed in bracket 17 located on the output shaft 16b side. Moreover, bracket 17 is press-fitted onto stator 10 such that a coupling end part formed on the outer periphery of bracket 17 is fitted onto a corresponding coupling end part of stator 10. This completes the brushless motor according to the first embodiment.

This configuration allows easy assembling work of the motor.

Moreover, printed circuit board 18 includes drive circuit 40 that controls the electric current flowing through stator winding 12. Drive circuit 40 includes ground line 42.

As shown in FIG. 4, printed circuit board 18 includes impedance element 41 as well that is configured with not smaller than one pair of conductive patterns 60 and 70. Printed circuit board 18 includes not smaller than one pair, that is, at least a plurality of the conductive patterns. Impedance element 41 has a capacitive component being a principal component. Impedance element 41 is configured with a circuit element which is approximately equivalent to capacitance element 43.

Note that, in the first embodiment described above, the descriptions have been made regarding the configuration which adopts brackets 17 and 19 formed of the electrically-conductive metal.

The configuration may be the following one provided that outer rings 151a and 151b of the pair of bearings 15 are electrically coupled with each other.

That is, brackets 17 and 19 may be formed with an insulating material, resin, or the like instead of the metal material. Alternatively, any one of the brackets may be formed with the metal electrically conductive while the other may be formed with an insulating material including resin and the like.

Moreover, in the first embodiment described above, the descriptions have been made regarding electric motor 100 in which stator 10, bracket 19, and the like are integrally molded with the resin. Such electric motor 100 is called a resin molded motor.

Note that, the present invention is effective even for the configuration in which the stator and the like serving as the armor are accommodated in a metal case. Such an electric motor is called a steel-sheet motor.

Next, Specific Examples will be described in which electric motor 100 according to the first embodiment offers further outstanding functional effects, with reference to FIGS. 2 to 11.

Specific Example 1

Figure 2:
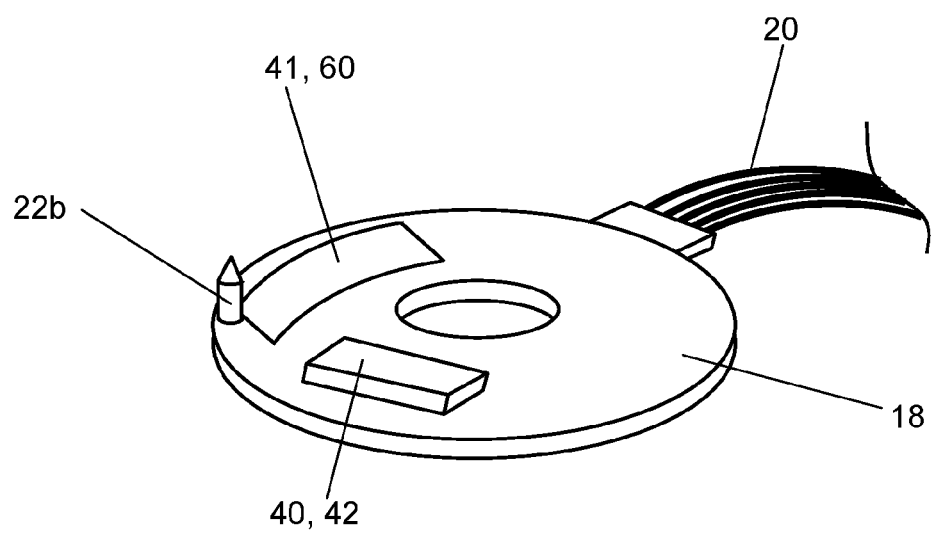
FIG. 2 is a perspective view of Specific Example 1 of a printed circuit board that is used in the motor according to the first embodiment of the invention.
Figure 3:
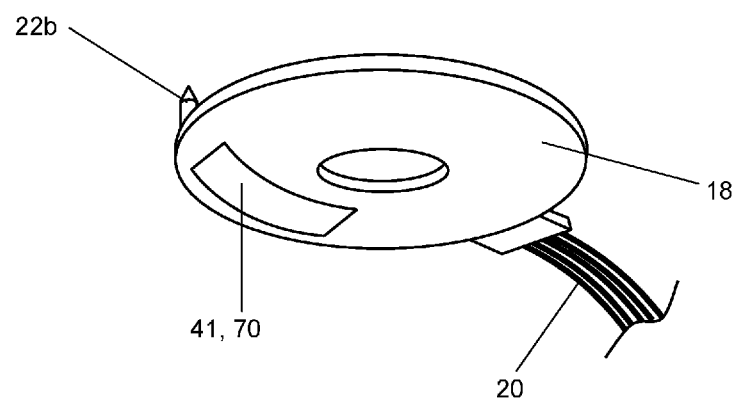
FIG. 3 is a perspective view of another Specific Example 1 of the printed circuit board that is used in the motor according to the first embodiment of the invention.
Figure 5:
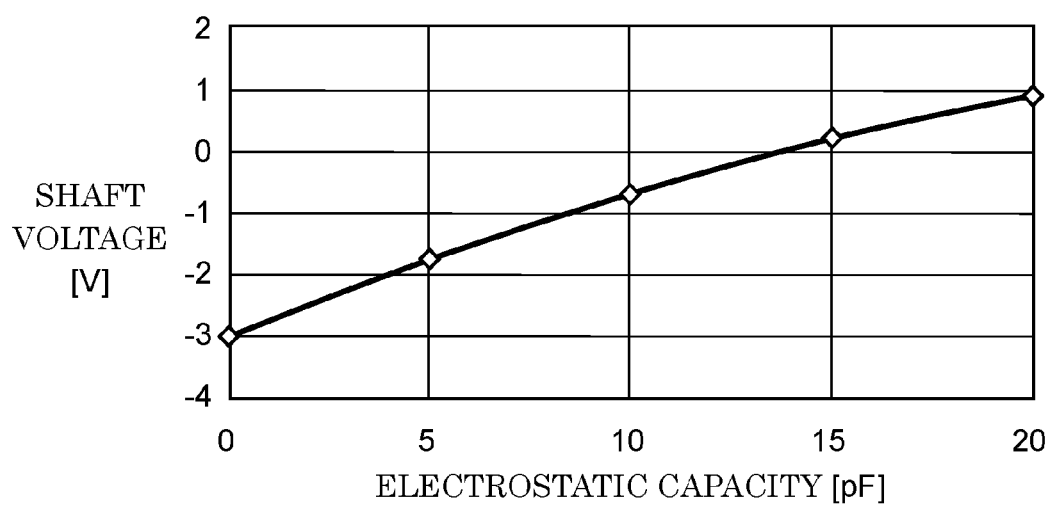
FIG. 5 is a graph of characteristics of the motor according to the first embodiment of the invention, with the graph showing a relation between electrostatic capacity of a capacitive component and shaft voltage of the motor.

FIG. 2 is a perspective view of Specific Example 1 of a printed circuit board that is used in the motor according to the first embodiment of the present invention. FIG. 3 is a perspective view of another Specific Example 1 of the printed circuit board that is used in the motor according to the first embodiment of the invention. FIG. 4 is a perspective view of yet another Specific Example 1 of the printed circuit board that is used in the motor according to the first embodiment of the invention. FIG. 5 is a graph of characteristics of the motor according to the first embodiment of the invention, with the graph showing a relation between electrostatic capacity of a capacitive component and shaft voltage of the motor.

As shown in FIGS. 2 to 4, printed circuit board 18 included in electric motor 100 includes the following impedance element 41.

That is, as shown in FIGS. 2 to 4, impedance element 41 is capacitance element 43 which has a capacitive component being a principal component.

As shown in FIG. 2 or 3, each of conductive patterns 60 and 70 is located on corresponding one side of printed circuit board 18. Each of conductive patterns 60 and 70 forms impedance element 41.

Alternatively, as shown in FIG. 4, conductive patterns 60 and 70 are located respectively on both sides of printed circuit board 18.

With reference to FIGS. 2 to 4, more detailed descriptions will be made.

As shown in FIGS. 2 and 4, printed circuit board 18 includes, on the upper face side, output-shaft side current-carrying pin 22b and conductive pattern 60 which is electrically coupled with output-shaft side current-carrying pin 22b. In the following descriptions, the face located-on-upper-side of printed circuit board 18 is designated as the upper face in the figures, for an easier understanding of the descriptions. Similarly, the face located-on-lower-side of printed circuit board 18 is designated as the lower face in the figures.

Moreover, in Specific Example 1, copper is used for all materials of conductive patterns 60 and 70.

As shown in FIGS. 3 and 4, printed circuit board 18 includes, on the upper face side, output-shaft side current-carrying pin 22b. Printed circuit board 18 includes, on the lower face side, conductive pattern 70. Conductive pattern 70 is electrically coupled with both the ground line included in interconnection lines 20 and the ground line included in the control circuit.

That is, between bracket 17 located on the output shaft 16b side and the ground included in printed circuit board 18, there are formed conductive pattern 60 and conductive pattern 70 to face each other, which thereby produces a capacitive component. Conductive pattern 60 is located on the upper face side of printed circuit board 18, while conductive pattern 70 is located on the lower face side of printed circuit board 18.

The capacitive component can be changed via the following factors. That is, the first factor is a facing area in which conductive pattern 60 and conductive pattern 70 face each other.

The second factor is the thickness of printed circuit board 18 which is located between conductive pattern 60 and conductive pattern 70.

The third factor is the dielectric constant of printed circuit board 18 which is located between conductive pattern 60 and conductive pattern 70.

By changing the capacitive component, the shaft voltage generated in the motor can be controlled.

A specific example is shown below in which the shaft voltage generated in the motor is controlled by changing the capacitive component.

As shown in FIG. 5, in the first embodiment, the shaft voltage is at the minimum when the capacitive component is 14.5 pF.

Note that, in the first embodiment, printed circuit board 18 was measured and the results of the measurement are as follows: That is, the measured thickness of printed circuit board 18 is 1.2 mm. The relative dielectric constant of printed circuit board 18 is 4.5. The facing area in which conductive pattern 60 and conductive pattern 70 face each other is 437 $mm^2$, in printed circuit board 18.

Specific Example 2

Figure 6:
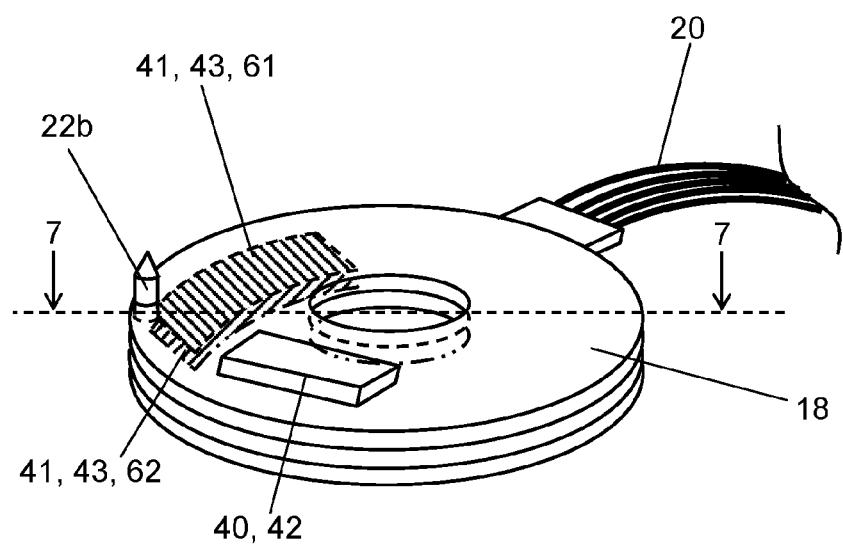
FIG. 6 is a perspective view of Specific Example 2 of the printed circuit board that is used in the motor according to the first embodiment of the invention.
Figure 7:
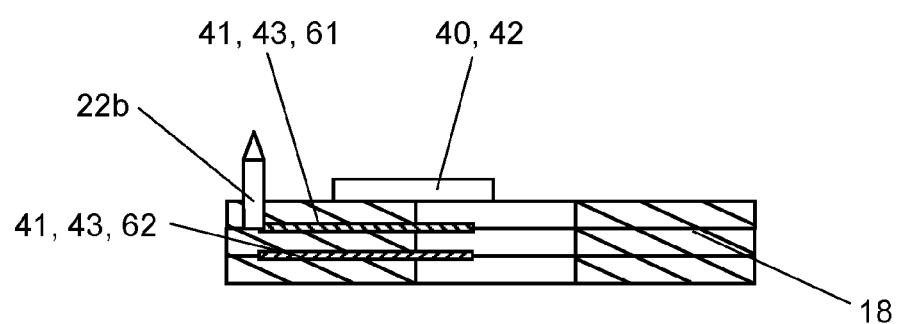
FIG. 7 is a cross-sectional view taken along line 7-7 of FIG. 6.
Figure 8:
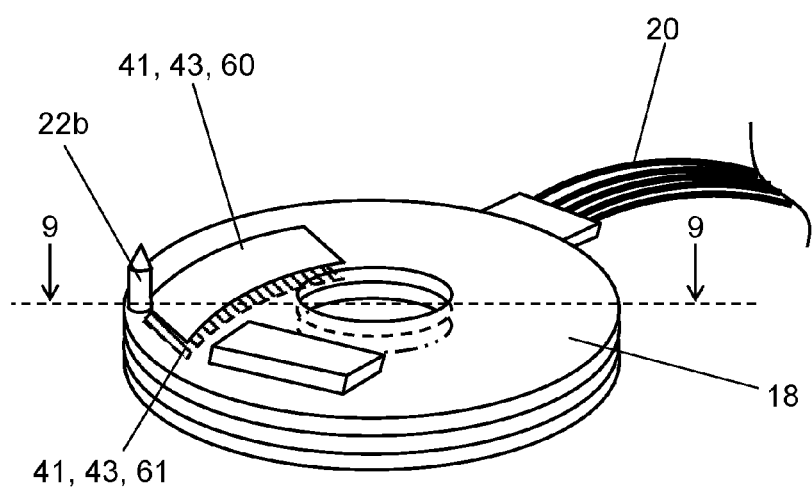
FIG. 8 is a perspective view of another Specific Example 2 of the printed circuit board that is used in the motor according to the first embodiment of the invention.
Figure 9:
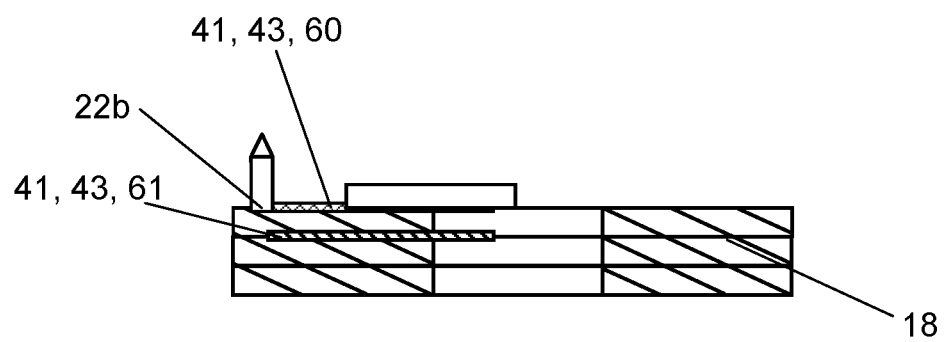
FIG. 9 is a cross-sectional view taken along line 9-9 of FIG. 8.

FIG. 6 is a perspective view of Specific Example 2 of the printed circuit board that is used in the motor according to the first embodiment of the present invention. FIG. 7 is a cross-sectional view taken along line 7-7 of FIG. 6. FIG. 8 is a perspective view of another Specific Example 2 of the printed circuit board that is used in the motor according to the first embodiment of the invention. FIG. 9 is a cross-sectional view taken along line 9-9 of FIG. 8.

As shown in FIGS. 6 to 9, printed circuit board 18 included in electric motor 100 includes impedance element 41 as follows.

That is, as shown in FIGS. 6 to 9, printed circuit board 18 is a multilayer board. Each of conductive patterns 61 and 62 is located between layers of the multilayer board. Each of conductive patterns 61 and 62 forms impedance element 41.

With reference to FIGS. 6 and 7, more detailed descriptions will be made.

In Specific Example 1, printed circuit board 18 is a one-sided board in which conductive patterns 60 and 70 are disposed on its one side. In addition, in another Specific Example 1, printed circuit board 18 is a double-sided board in which conductive patterns 60 and 70 are disposed respectively on its both sides.

In Specific Example 2, as shown in FIGS. 6 and 7, printed circuit board 18 is the multilayer board which includes conductive patterns 61 and 62 between its layers.

In the case where the multilayer board is used, as shown in FIGS. 6 and 7, conductive pattern 61 located in a first inner layer faces conductive pattern 62 located in a second inner layer. The capacitive component is generated in accordance with a facing area in which conductive pattern 61 faces conductive pattern 62.

In another Specific Example 2, as shown in FIGS. 8 and 9, printed circuit board 18 may be configured such that conductive pattern 60 located in an outer layer faces conductive pattern 61 located in an inner layer, i.e. the first inner layer. In this configuration, the capacitive component is generated in accordance with the facing area in which conductive pattern 60 faces conductive pattern 61.

Even in any of the Specific Examples described above, the capacitive component can be adjusted by changing the facing area.

Specific Example 3

Figure 10:
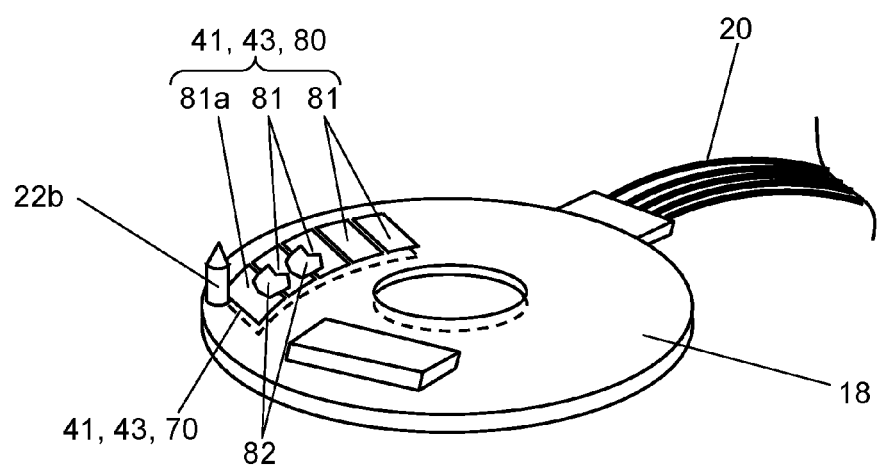
FIG. 10 is a perspective view of Specific Example 3 of the printed circuit board that is used in the motor according to the first embodiment of the invention.
Figure 11:
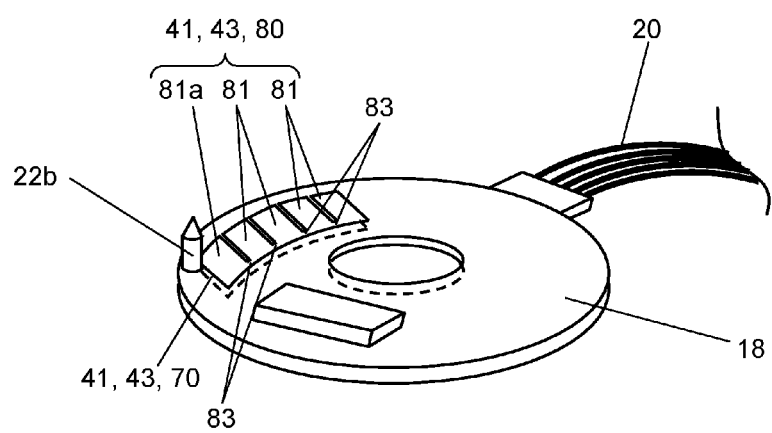
FIG. 11 is a perspective view of another Specific Example 3 of the printed circuit board that is used in the motor according to the first embodiment of the invention.

FIG. 10 is a perspective view of Specific Example 3 of the printed circuit board that is used in the motor according to the first embodiment of the present invention. FIG. 11 is a perspective view of another Specific Example 3 of the printed circuit board that is used in the motor according to the first embodiment of the invention.

As shown in FIGS. 10 and 11, printed circuit board 18 included in electric motor 100 includes impedance element 41 as follows.

That is, as shown in FIGS. 10 and 11, impedance element 41 is capacitance element 43 which has a capacitive component being a principal component. Impedance element 41 is formed with each of conductive patterns 80. Each of conductive patterns 80 includes at least not smaller than two block patterns 81 and 81a. Block patterns 81 and 81a include either electrical connection parts 82 or electrical disconnection parts 83. Each of conductive patterns 80 can be adjusted in its capacitive component by either connecting between block patterns 81 and 81a or disconnecting between block patterns 81 and 81a.

With reference to FIGS. 10 and 11, more detailed descriptions will be made.

As shown in FIG. 10, Specific Example 3 differs in the following points, compared with Specific Examples 1 and 2. That is, in Specific Example 3, conductive pattern 80 located on the upper face side of printed circuit board 18 is divided into a plurality of block patterns 81 and 81a. Of five blocks that are formed by dividing conductive pattern 80, block pattern 81a is electrically coupled with bracket 17 located on the output shaft 16b side, via output-shaft side current-carrying pin 22b.

In Specific Example 3, areas of block patterns 81 and 81a are equal to each other. Specifically, each area of block patterns 81 and 81a is 150 mm$^2$. Moreover, the capacitive component generated between one block pattern 81 and conductive pattern 70 located on the lower face side of printed circuit board 18, is 5.0 pF.

With this configuration described above, conductive pattern 80 is such that block patterns 81 and 81a are electrically coupled with each other via connection parts 82, e.g. solder, lead wires, etc. Therefore, in the motor in which conductive pattern 80 is adopted, the capacitive component can be adjusted toward higher values.

With the electric motor which adopted conductive pattern 80 shown in Specific Example 3, its capacitive component can be adjusted between 5 pF and 25 pF, with the component being generated between bracket 17 located on the output shaft 16b side and the ground included in printed circuit board 18.

Alternatively, in the case where the following configuration is used, the electric motor which adopts conductive pattern 80 is such that its capacitive component can be adjusted toward lower values.

That is, as shown in FIG. 11, conductive pattern 80 includes conductive patterns 83, serving as the disconnection parts, which electrically connect between block patterns 81 and 81a. In order to achieve a desired capacitive component, conductive patterns 83 present at appropriate locations can be disconnected. Conductive patterns 83 are cut with laser light, an ultrasonic cutter, or the like.

Moreover, a combined adoption of the configuration shown in FIG. 10 and the configuration shown in FIG. 11 may be allowed. In this case, conductive pattern 80 can be adjusted in its capacitive component toward both directions, that is, an increasing and a decreasing direction.

It is clear from the above descriptions that some of the electric apparatuses equipped with the electric motors sometimes vary their shaft voltages. Even with these cases, such shaft voltages can be easily changed in accordance with the apparatuses equipped with the motors.

In other words, the electric motor according to the first embodiment can be easily adjusted in its shaft voltage, compared to other configuration in which the shaft voltage is adjusted by changing the area of the dielectric layer included in the rotor or by changing the material and/or shape of the insulating resin that forms the dielectric layer. Therefore, such a simple configuration according to the first embodiment allows the electric motors to have increased versatility, resulting in increased industrial value of the motors.

Moreover, the electric motor according to the first embodiment is such that its capacitive component is adjusted through use of the conductive patterns included in the printed circuit board. Accordingly, the space inside the motor can be utilized effectively. That is, conventional motors have had a problem that the insertion of an additional capacitor results in an increase in thickness of the printed circuit board. Fortunately, the motor according to the first embodiment is allowed to adjust its capacitive component without increasing the thickness of the printed circuit board. In addition, the motor according to the first embodiment eliminates the need for mounting an additional capacitor, allowing lower costs for countermeasures against the electrolytic corrosion.

In the configuration described above, the printed circuit board adopts a one-sided board which has a conductive pattern on its one side.

Besides this, the configuration may be as follows: That is, the conductive pattern formed on the one side of the printed circuit board is a pair of conductive patterns which is disposed in close proximity to each other. Such a pair of the conductive patterns causes a capacitive component when it has a comb, meander, spiral, or the like shape.

Moreover, the electric motor according to the first embodiment may be configured with a parallel circuit, a series circuit, or a combination of a parallel and series circuits. Such a circuit can be formed by combining capacitive components, i.e. a component caused by a capacitor and a component caused by a conductive pattern included in the printed circuit board.

Note that an epoxy resin based material is commonly used for forming the insulating layer of the printed circuit board. Besides this, a fluorocarbon resin based material, an inorganic compound based material, or the like may be used for forming the insulating layer of the printed circuit board.

By the way, in the equivalent circuit of the electric motor according to the first embodiment, the connection position of an equivalent circuit that indicates the capacitive component obtained by the conductive pattern is different from the connection position of an equivalent circuit that indicates the capacitive component obtained by the dielectric layer disposed in the rotor.

However, in the equivalent circuit of the electric motor according to the first embodiment, the former connection position is a suitable location for adjusting the capacitive component, by increasing or decreasing the shaft voltage generated in the motor. This knowledge has been derived from technical trials and analyses of equivalent circuits of electric motors, which were conducted by the inventors of the present invention.

Moreover, as described above, the equivalent circuit of the electric motor is different depending on the type and structure of motor. For example, the motor's equivalent circuit is clearly different between the motor in which its stator winding and stator iron core are covered with an insulating resin and the motor in which its stator winding and stator iron core are covered with a metal case.

In addition, the motor's equivalent circuit is also different depending on the structure of the rotor included in the motor. For example, the equivalent circuit of the motor differs depending on the factors including: Whether the rotor iron core is present or absent which configures the backyoke included in the rotor; whether the resistance of the magnets is high or low which configures the magnetic poles; and a combination of whether the stator iron core is present or absent which configures the backyoke of the rotor and whether the resistance of the magnets is high or low which configures the magnetic poles.

Consequently, it is considered that different measures to reduce electrolytic corrosion of electric motors are preferably adopted for different types and structures of the motors.

Therefore, the technology according to the embodiment is useful for countermeasures against electrolytic corrosion of the electric motors because it allows individual adjustments of the capacitive components of the motors, on an individually-for-every-motor basis.

Second Exemplary Embodiment

Next, an embodiment will be described in which the electric motor described in the first embodiment is installed an electric apparatus, with reference to the accompanying drawing. Note that, in the description to be made below, a specific example of the electric apparatus will be described using the indoor unit of an air conditioner.

Figure 12:
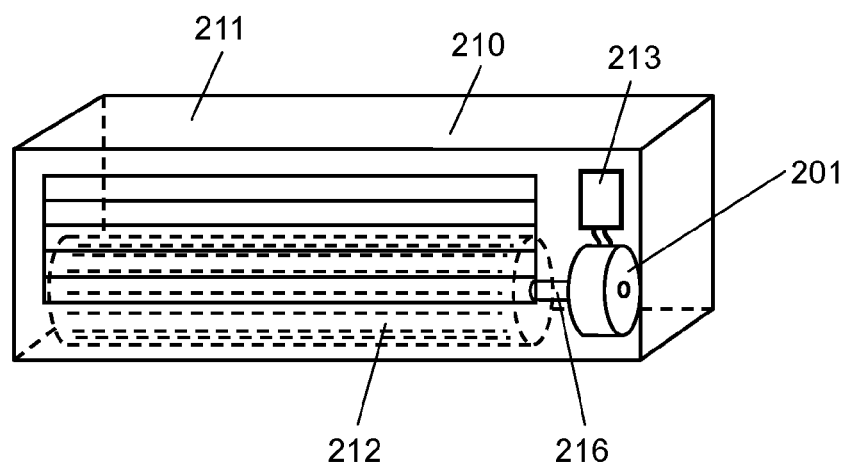
FIG. 12 is a schematic view of the indoor unit of an air conditioner, with the unit being equipped with the electric motor described in the first embodiment of the present invention.

FIG. 12 is a schematic view of the indoor unit of the air conditioner, with the unit being equipped with the electric motor described in the first embodiment of the present invention.

As shown in FIG. 12, air-conditioner indoor unit 210, which is an electric apparatus according to a second embodiment of the present invention, includes electric motor 201 and electric-motor driving device 213 that is a driving part for driving electric motor 201.

A detailed description is made with reference to the drawing.

As shown in FIG. 12, in the inside of case 211 of air-conditioner indoor unit 210, electric motor 201 is installed. Cross-flow fan 212 is attached to shaft 216 included in electric motor 201. A heat exchanger is disposed in the inside of case 211.

Electric motor 201 is driven by electric-motor driving device 213 that is the driving part. To electric motor 201, a drive signal is output from electric-motor driving device 213. With the drive signal, electric motor 201 rotates. The rotation of electric motor 201 causes rotation of cross-flow fan 212. Then, the rotation of cross-flow fan 212 allows blowing of air, which has been conditioned by the heat exchanger, into the room where the air-conditioner indoor unit is installed. Electric motor 201 may be the brushless motor shown in the first embodiment described above.

Note that, in the embodiment described above, the specific electric apparatus according to the second embodiment of the present invention has been exemplified by the air-conditioner indoor unit. Beside this specific example, the technology can also be applied to motors used in other apparatuses including: air-conditioner outdoor units, and a wide range of information and industrial apparatuses.

INDUSTRIAL APPLICABILITY

Electric motors according to the present invention are capable of effectively reducing the occurrence of electrolytic corrosion of their bearings by reducing their shaft voltages. For this reason, the technology according to the present invention is useful mostly for electric motors installed in electric apparatuses in which reduced costs and longer service life of the motors are desired. Such electric apparatuses include: air-conditioner indoor units, air-conditioner outdoor units, information apparatuses, and industrial apparatuses, for example.

The invention claimed is:
1. An electric motor comprising:
 a stator including:
  a stator iron core; and
  a winding wound on the stator iron core;
 a rotor including:
  a rotating body including:
   permanent magnets facing the stator and located in a circumference direction;
   an outer iron core formed by stacking steel sheets and located on an outer peripheral side;
   an inner iron core formed by stacking steel sheets and located on an inner peripheral side; and
   a dielectric layer located between the outer iron core and the inner iron core; and
  a shaft passing through a shaft center of the rotating body and attached to the rotating body, wherein, in a direction of the shaft center, one side of the shaft is an output shaft side and the other side is a non-output shaft side;

a pair of bearings located to interpose the rotating body therebetween in the direction of the shaft center so as to rotatably support the shaft, the bearings each including:
- an inner ring; and
- an outer ring;

an outer-ring conducting part for electrically coupling the outer rings to each other, the outer rings being included respectively in the pair of the bearings; and a printed circuit board including:
- a drive circuit including a ground line and controlling an electric current flowing through the winding; and
- an impedance element configured with at least not smaller than one pair of conductive patterns, wherein one of each pair of the conductive patterns configuring the impedance element is electrically coupled with the outer-ring conducting part, and the other of each pair of the conductive patterns configuring the impedance element is electrically coupled with the ground line included in the drive circuit.

2. The electric motor according to claim 1, further comprising a pair of brackets for respectively holding the pair of the bearings, the brackets being formed of a metal and having electric conductivity, wherein the one of each pair of the conductive patterns configuring the impedance element is electrically coupled with at least one of the outer-ring conducting part and the one of the pair of the brackets.

3. The electric motor according to claim 2, further comprising a resin part for integrally molding the stator and one of the pair of the brackets, wherein the one is located on the non-output shaft side of the shaft and holds the bearing located on the non-output shaft side.

4. The electric motor according to claim 3, wherein the resin part buries at least one part of the outer-ring conducting part.

5. The electric motor according to claim 1, wherein the impedance element is a capacitance element having a capacitive component as a principal component.

6. The electric motor according to claim 1, wherein each of the conductive patterns configuring the impedance element is located on either one side or both sides of the printed circuit board.

7. The electric motor according to claim 1,
wherein the printed circuit board is a multilayer board, and
each of the conductive patterns configuring the impedance element is located between layers included in the multilayer board.

8. The electric motor according to claim 1,
wherein the impedance element is a capacitance element having a capacitive component as a principal component,
each of the conductive patterns configuring the impedance element includes at least not smaller than two block patterns that include either an electric connection part or an electric disconnection part, and
the capacitive component is adjusted by either connecting or disconnecting between the block patterns.

9. An electric apparatus comprising:
the electric motor according to claim 1; and
a driving part for driving the motor.

* * * * *